Jan. 5, 1926.
A. C. HELLERMAN
1,568,734
METHOD OF MAKING SAUSAGE CASINGS
Filed June 25, 1925
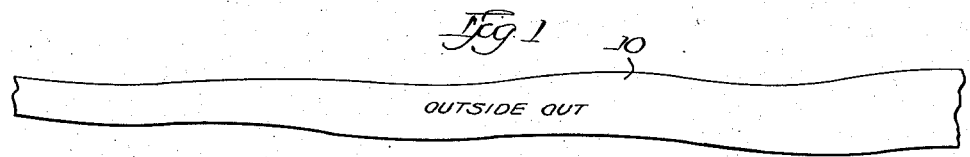
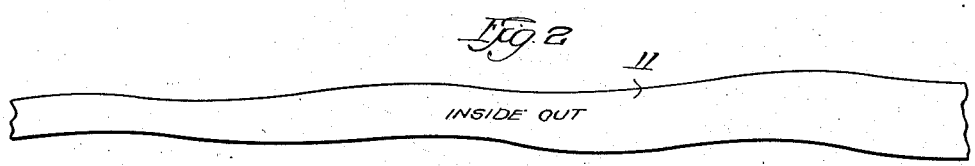
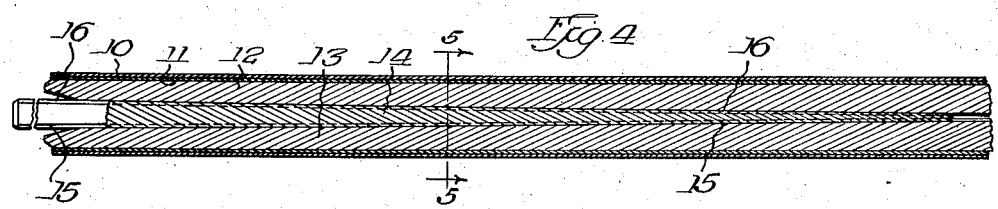
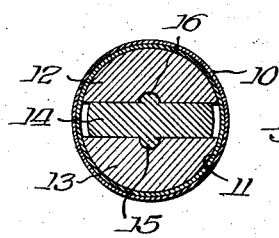
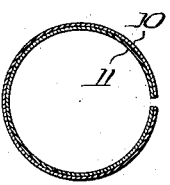
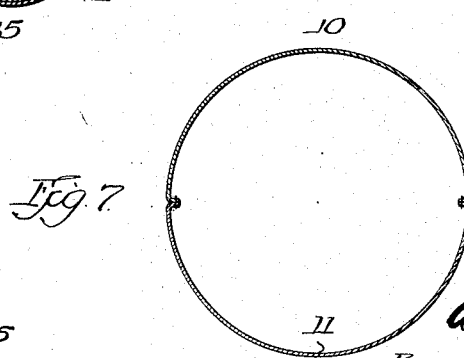

Patented Jan. 5, 1926.

1,568,734

UNITED STATES PATENT OFFICE.

ADOLPH C. HELLERMAN, OF CHICAGO, ILLINOIS, ASSIGNOR TO WOLF, SAYER & HELLER, OF CHICAGO, ILLINOIS, A CORPORATION OF DELAWARE.

METHOD OF MAKING SAUSAGE CASINGS.

Application filed June 25, 1925. Serial No. 39,523.

*To all whom it may concern:*

Be it known that ADOLPH C. HELLERMAN, a citizen of the United States, residing at Chicago, in the county of Cook and State of Illinois, has invented certain new and useful Improvements in a Method of Making Sausage Casings, of which the following is a specification.

My invention relates to the production of sausage casings of large size, composed of two or more sections of animal intestines.

It is well known that the supply of large size casings is insufficient and that there is an excess of small size casings. In order to compensate for the inequality in numbers, various processes have been devised for increasing the available quantity of the large size casings, the result being accomplished usually by sewing together two or more small size intestines. A method is disclosed in the patent to May, No. 1,063,713, in which two small size casings are placed in telescoped relation and then expanded by the use of air pressure or otherwise until the contacting surfaces of the telescoped casings adhere. Thereafter the adhering casings are slitted and the two marginal edges of the so-formed strips are stitched. This results in a casing slightly less than twice the diameter of the small intestines used.

My invention contemplates the utilization of an expanding mandril so arranged that two or more telescoped intestines are placed thereover and the mandril expanded, the cross sectional diameter of the mandril in its expanded condition being substantially uniform from end to end thereof. As a result, the casings produced are of uniform size from end to end, instead of tapered, and are straight throughout their length. These are important advantages and constitute a substantial advance in the art.

The invention will be more readily understood by reference to the accompanying drawing in which;

Figs. 1 and 2 are views of two intestines in their original condition, ready to be telescoped.

Fig. 3 is a view of the casings after having been assembled.

Fig. 4 is a longitudinal sectional view through the mandril and assembled intestines.

Fig. 5 is an enlarged sectional view on the line 5—5 of Fig. 4.

Fig. 6 is a view of the assembled intestines after slitting and removal from the mandril, and Fig. 7 is an end view of a completed casing constructed in accordance with my invention.

In carrying out of the process, I take a small intestine, 10, and a similar intestine 11, the latter being turned inside out, and place them in telescoping relation as shown in Fig. 3. It will be understood that the outside surfaces of the intestines contain considerable fatty matter adhering thereto, and that the inside surfaces are smooth and contain a very thin layer of mucus or slime. For sanitary reasons, the original interior of the intestines should be located on the outside of the finished casing and for similar reasons the fatty substance originally found on the exterior should be on the interior in order to be protected from the air and to add to the food value of the sausage. Therefore, the casing, 11, is placed inside of the casing, 10, so that the two slimy surfaces are in contact.

At this point, a mandril composed of two semi-circular sections, 12, 13, is placed within the telescoped intestines and a wedge element, 14, inserted between the semi-circular sections. This is forced inwardly from the smaller end of the assembled intestines until a point is reached where the diameter is substantially uniform from end to end of the assembled intestines. At this point, the assembled intestines are placed in a drying room for a few hours until the contacting slimy surfaces adhere and the intestines material has taken a permanent set. Thereafter the intestines are slitted from end to end and removed from the mandril as shown in Fig. 6. Each of the two marginal edges are then stitched at a point close to the edges. The parts are then in the form of a flat, double-thickness strip of uniform width. By the use of water for softening, the adhering surfaces are separated and the casing turned inside out. In this condition, the original outsides of the intestines are on the inside and the seam formed by the stitching is likewise on the inside, whereas the original insides of the intestines are on the outside. Furthermore, the casing is straight and of uniform diameter from end to end. This process presents several advantages over processes in which air under pressure is used, one of which advantages is that intestines may be used that have a tear or opening therein such as would allow the escape of air, but which would not render the casing unfit for use. The openings in such casings are commonly repaired by placing over the opening on the inside small sections of intestine material that will adhere to the adjacent surfaces.

In order to insure straight-line travel of the wedge element between the tapered, semi-circular mandril sections, I provide a longitudinal groove on the flat face of each of the sections, 13, 14. The wedge has on its opposite faces ribs, 15, 16 for cooperation with the grooves. By this simple means I avoid the danger of lateral deflection of the wedge and consequent damage to the casing thereon.

The described process may be carried out very economically and with a small investment, the mandrils being simply manufactured from half-round sections of wood, tapered from end to end. Of course, a more elaborate mandril may be used consisting of metallic sections hinged together and provided with means for expansion under screw pressure, but I have found such elaboration unessential and too expensive in first cost. Changes may be made in some of the steps of the process, and I do not wish to be limited except as indicated in the appended claims.

I claim:

1. The method of forming large size, straight sausage casings of uniform diameter from end to end thereof, which consists in telescoping two small, tapered intestines, then inserting a mandril therein, then expanding the mandril from the small end of the intestines until the small ends are approximately the same diameter as the large ends, then drying the assembled intestines until the contacting surfaces adhere, then slitting the adhering intestines, then sewing along both edges, and then turning the so-formed tube inside out.

2. The method of producing large size sausage casings that are of uniform diameter and straight, which consists in utilizing two small, tapered intestines, turning one of said intestines inside out and placing it on a mandril, then placing the other of said intestines on said mandril over the first mentioned intestine without turning it, then expanding said mandril from the small ends of the superposed intestines until the intestines are of substantially uniform diameter from end to end thereof, then drying until the intestines adhere and take a permanent set, then sliting and removing the intestines from the mandril, then sewing along the two margins, and then turning the so-formed tube inside out whereby the original outsides of the intestines are on the inside of the finished casing.

In testimony whereof I have affixed my signature.

ADOLPH C. HELLERMAN